United States Patent
Aviani, Jr. et al.

(10) Patent No.: US 6,594,260 B1
(45) Date of Patent: Jul. 15, 2003

(54) CONTENT ROUTING

(75) Inventors: James Anthony Aviani, Jr., Santa Barbara, CA (US); Frederick Jurgens Baker, Santa Barbara, CA (US); Ulana Maria Sonia Legedza, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/390,520

(22) Filed: Sep. 3, 1999

(51) Int. Cl.[7] .............................................. H04L 12/56
(52) U.S. Cl. ...................... 370/389; 370/235; 709/203; 709/217; 709/228
(58) Field of Search .................................. 370/229, 230, 370/235, 251, 357, 389, 395.52, 400; 711/100; 709/201, 202, 203, 218, 225, 226, 227, 228, 230, 238, 239, 217

(56) References Cited

U.S. PATENT DOCUMENTS

| | | | | |
|---|---|---|---|---|
| 5,941,988 A | * | 8/1999 | Bhagwat et al. ............ | 713/201 |
| 6,157,942 A | * | 12/2000 | Chu et al. ................... | 709/203 |
| 6,205,149 B1 | * | 3/2001 | Lemaire et al. ............. | 370/400 |
| 6,240,461 B1 | * | 5/2001 | Cieslak et al. .............. | 709/235 |
| 6,298,380 B1 | * | 10/2001 | Coile et al. ................. | 709/203 |
| 6,389,462 B1 | * | 5/2002 | Cohen et al. ................ | 707/10 |
| 6,449,647 B1 | * | 9/2002 | Colby et al. ................ | 709/226 |
| 6,510,469 B1 | * | 1/2003 | Starnes et al. .............. | 709/247 |
| 2002/0007404 A1 | * | 1/2002 | Vange et al. ................ | 709/217 |
| 2002/0116475 A1 | * | 8/2002 | Berg .......................... | 709/219 |

OTHER PUBLICATIONS

Yang et al. "An Effective Mechanism for Supporting Content-based Routing in Scalable Server Clusters". IEEE Parallel Processing. Sep. 21, 1999–Sep. 21, 1999. pp. 240–245.*

Charles E. Perkins. "Service Location Protocol for Mobile Users". IEEE. Indoor and Mobile Radio Communications, 1998. Sep. 8–11, 1998. pp. 141–146.*

Barzilai et al. "Design and Implementation of an RSVP-Based Quality of Service Architecture for an Integrated Services Internet". IEEE Journal on Selected Areas of Communications. Apr. 1998. pp. 397–413.*

Wessels et al. "ICP and the Squid Web Cache". IEEE Journal on Selected Areas of Communications. Apr. 1998. pp. 345–357/.*

(List continued on next page.)

*Primary Examiner*—Melvin Marcelo
*Assistant Examiner*—Derrick W Ferris
(74) *Attorney, Agent, or Firm*—Marger Johnson & McCollom, P.C.

(57) ABSTRACT

Before sending a connection setup packet, a client sends a heads up packet (HUP) toward the server from which the client is requesting data. The HUP contains information about the data that the client is requesting. Recipient servers along the path between the client and the requested server decode the HUP. If the recipient servers know of a more convenient source for the requested data, the setup and heads up packets are modified to point to the more convenient source and are forwarded in the source's direction. HUPs are designed to be ignored by recipient servers not designed to decode them. In this way, HUPS can operate over existing networks. HUPs are designed to be small, to facilitate quick decoding and ensure the HUP is not fragmented. A HUP includes an indication of the setup packet about whose connection it has data. If a server receives the HUP but not the associated setup packet, the server will drop the HUP. If HUPs are used, a client or its proxy must be prepared to accept an acknowledgement of the connection from a server it did not request. Otherwise, HUPs are unnecessary and problematic.

59 Claims, 6 Drawing Sheets

OTHER PUBLICATIONS

Erol Basturk, Robert Engel, Robert Haas, Vinod Peris, and Debanjan Saha; "Using Network Layer Anycast for Load Distribution in the Internet", IBM Research Division, T.J. Watson Research Center, Jul. 29, 1997, pp. 1–21.

James D. Guyton and Michael F. Schwartz, "Locating Nearby Copies of Replicated Internet Servers", In Proc. Of SIGCOMM '95, Aug. 1995, pp. 288–298.

Zongming Fei, Samrat Bhattacharjee, Ellen W. Zegura and Mostafa H. Ammar, "A Novel Server Selection Technique for Improving the Response Time of a Replicated Service", In Proc. of INFOCOM '98, Apr. 1998, pp. 783–791.

J. Veizades, E. Guttman, C. Perkins and S. Kaplan, "The Service Location Protocol", RFC 2165, Jun. 1997, pp. 1–72.

* cited by examiner

CONTENT ROUTING

FIELD OF THE INVENTION

This invention relates generally to computer system networking and, more particularly, to routing methods and apparatuses for routing network connections based on the data to be transferred during the network connection.

BACKGROUND OF THE INVENTION

Web caches, the Internet equivalent of the caches built into microprocessors today, store copies of documents the caches expect will be requested soon. Web caches are useful for three main reasons. First, they alleviate Internet hot spots by reducing the load seen by busy servers and increasing the availability of popular documents. Second, they bring documents closer to the clients accessing them, thereby reducing the latency component of download time. Third, by reducing the number of times duplicate data is sent over network links, web caches reduce network bandwidth utilization. Cache location often determines which of these benefits is most important to the cache provider or owner. For caches connected to inexpensive high capacity networks, latency is the most critical measure of caching effectiveness. For caches connected to expensive transoceanic connections, reducing bandwidth is most important.

Evidence of the benefits of web caching can be seen in the performance statistics of currently deployed caches. Hit rates of up to 50% (and byte hit rates of up to 35%) have been reported. While this shows a clear benefit in terms of bandwidth savings, this single improvement is not enough. Cable modems and Asynchronous Digital Subscriber Line (ADSL) have created a market for fast, large caches that are also capable of increasingly better throughput and lower latency. Under the very best conditions these modem high-end caches can currently handle 60 megabits per second (Mb/s) and the minimum latency they induce is 20 milliseconds (ms).

An increasingly popular way of improving the performance of a web cache is to leverage the contents of other caches. By servicing each other's misses, a group of cooperating caches can increase the overall cache hit rate observed by their clients. Since reducing latency is also critical, a key challenge for such distributed web caching is the design of an efficient method of forwarding web requests through a number of caches.

A cache mesh is an interconnected group of caches that works together to form a very large disk capacity (multi-terabyte) distributed cache. FIG. 1 shows an example of a subset of a cache mesh set up by UNINETT (the national research network of Norway). Cache meshes are most commonly deployed in regions separated from the bulk of the Internet by long-haul links, their purpose being to reduce the bandwidth usage across these expensive links. A cache mesh is formed by manually configuring a region of caches into an overlay network. Neighboring caches in this network, or mesh, exchange information about their contents using a specialized protocol, typically ICP (Internet Cache Protocol). This content information is then used to determine where to forward requests for documents that are not present locally. An effort is made to search a number of caches in the mesh before forwarding a request out over the long-haul link. This policy helps cache meshes accomplish their chief goal of reducing long-haul bandwidth. Despite this benefit, however, cache meshes remain hard to manage because of the difficulties of manual configuration.

Another option is to organize caches into transparent hierarchies. Using Web Cache Communication Protocol (WCCP) or a layer 4 switch, a web cache is installed at any network location to transparently intercept and service all web requests passing through that point. On a cache miss, the cache obtains the desired document by sending out a request addressed to the document's home server, causing this request to be picked up by the next upstream cache. So, in effect, each request travels up a hierarchy of caches rooted at the requested document's home server. Since caches do not need to know about each other in order to cooperate, a transparent web mesh can be created without any of the administrative work normally associated with cache meshes.

Although transparent hierarchies eliminate the problem of cache mesh management, they are not the final solution. Like cache meshes, transparent hierarchies suffer from the problem of long latency imposed by chains of TCP (Transmission Control Protocol) connections. Each cache between the client and the request's final destination must establish a TCP session with the requesting client or cache, read the request (URL), and then either service the request or create another TCP session with an upstream device. This results in the data travelling back to the client through a chain of TCP connections. For example, FIG. 2 shows a client 502 requesting a web document from server 508. Transparent caches 504, 506, and others are located on the network path between the client and the server. If none of these caches has the requested data, the client must establish a connection with cache 504 to request the data, cache 504 must establish a connection with cache 506 to request the data, cache 506 must do the same with the next cache, and so on until the request reaches the server 508.

Not only do all these individual requests for the data hurt end-to-end reliability by introducing many single points of failure into the connection, but performance of the data transfer suffers because packets are effectively being forwarded through multiple slow transport-layer devices instead of only through faster IP routers. Each TCP endpoint in the chain significantly increases network latency, an increasingly important component of download time. The situation is especially unfortunate for the growing percentage of Web traffic that is not cacheable at all. In this case, users see increased browsing delay with no benefit.

The problem only worsens as caches are more widely deployed, increasing the size of cache meshes/networks. For example, a typical network path may contain 10–20 hops. If a caching device were to exist at each hop and each device added a minimal 20 ms, the latency induced would be at least 360 ms for an 18 hop path. This is far greater than the time (about 100 ms) it would take to communicate directly with the server.

TCP chaining also exacerbates the already challenging problem of provisioning upstream caches located in or at the edge of the Internet backbone. Because such caches have to be able to keep up with the high speed/bandwidth links on which they sit, they have to be large and fast. This means that they are very expensive and physically large, requiring large amounts of expensive rack space. With TCP chaining in use, these caches would have to be TCP-level forwarders for every Web flow passing through. Not only is this unacceptable because of the latency issues discussed above, but no current caching solution/device could possibly do this fast enough to keep up with the OC3 and greater speeds of modern backbones.

Thus a need remains for a more efficient mechanism for forwarding web requests to different network elements.

SUMMARY OF THE INVENTION

The invention routes data requests based on their content. The client requesting the data sends a heads up packet (HUP) just before sending a setup packet requesting the network connection. The HUP identifies the data the client is requesting. A properly-equipped proxy device decodes the HUP and routes the setup packet according to the requested data. If the proxy device is aware of a network cache with the requested data, the proxy device forwards the setup and heads up packets to that cache. Otherwise, the proxy device forwards the setup and heads up packets in the direction of the server from which the client made the request.

HUPs are introduced without otherwise affecting the functionality of an network. It is important that a proxy device not equipped to decode HUPs not attempt to establish a connection with the client based on receipt of a HUP. The HUP is structured so that an unequipped proxy device will ignore the HUP. In a preferred embodiment, the HUP has a port and a reset flag setting that cause an unequipped proxy device to drop the HUP and prevent the proxy device from requesting the client to re-send the packet.

HUPs are matched to their setup packets. The HUP includes an identifier corresponding with an identifier in a setup packet. If a proxy device receives a HUP without receiving the matching setup packet, the proxy device can drop the HUP and wait for the client to re-send the setup and heads up packets. In a preferred embodiment over a TCP/IP network, the HUP uses the destination address, source address, destination port, and sequence number as the identifier for matching with the setup packet.

Setup packets can also be matched to their HUPs. The setup packet includes some identifier associating the setup packet to a HUP. If a proxy device receives a setup packet without receiving the matching HUP, the proxy device can choose to drop the setup packet and wait for the client to re-send the setup and heads up packets. Alternatively, the proxy device can process the setup packet as if no HUP is forthcoming.

DETAILED DESCRIPTION OF THE PREFERRED EMBODIMENT

Figure 1:
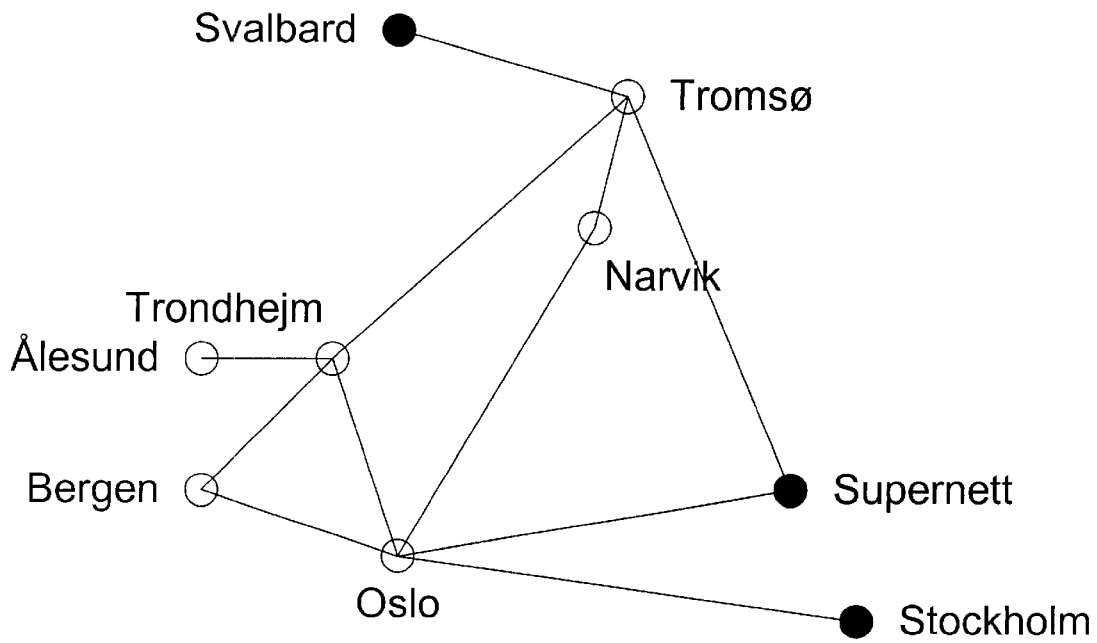
FIG. 1 shows an example of a cache mesh.
Figure 2:
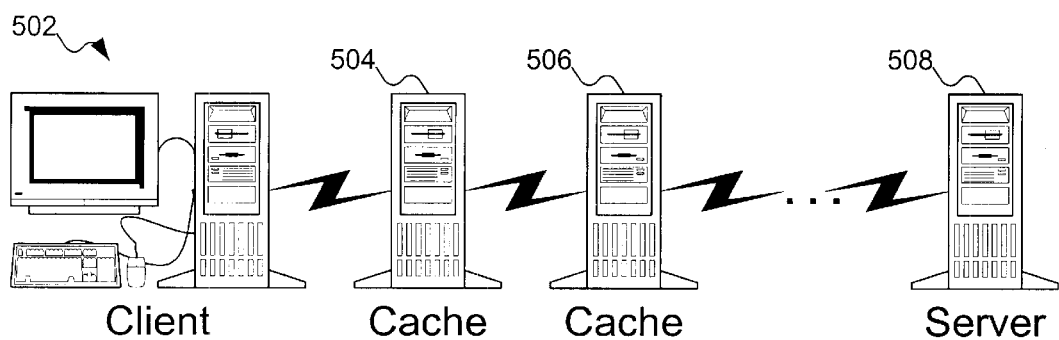
FIG. 2 shows an example of a hierarchical cache.
Figure 3:
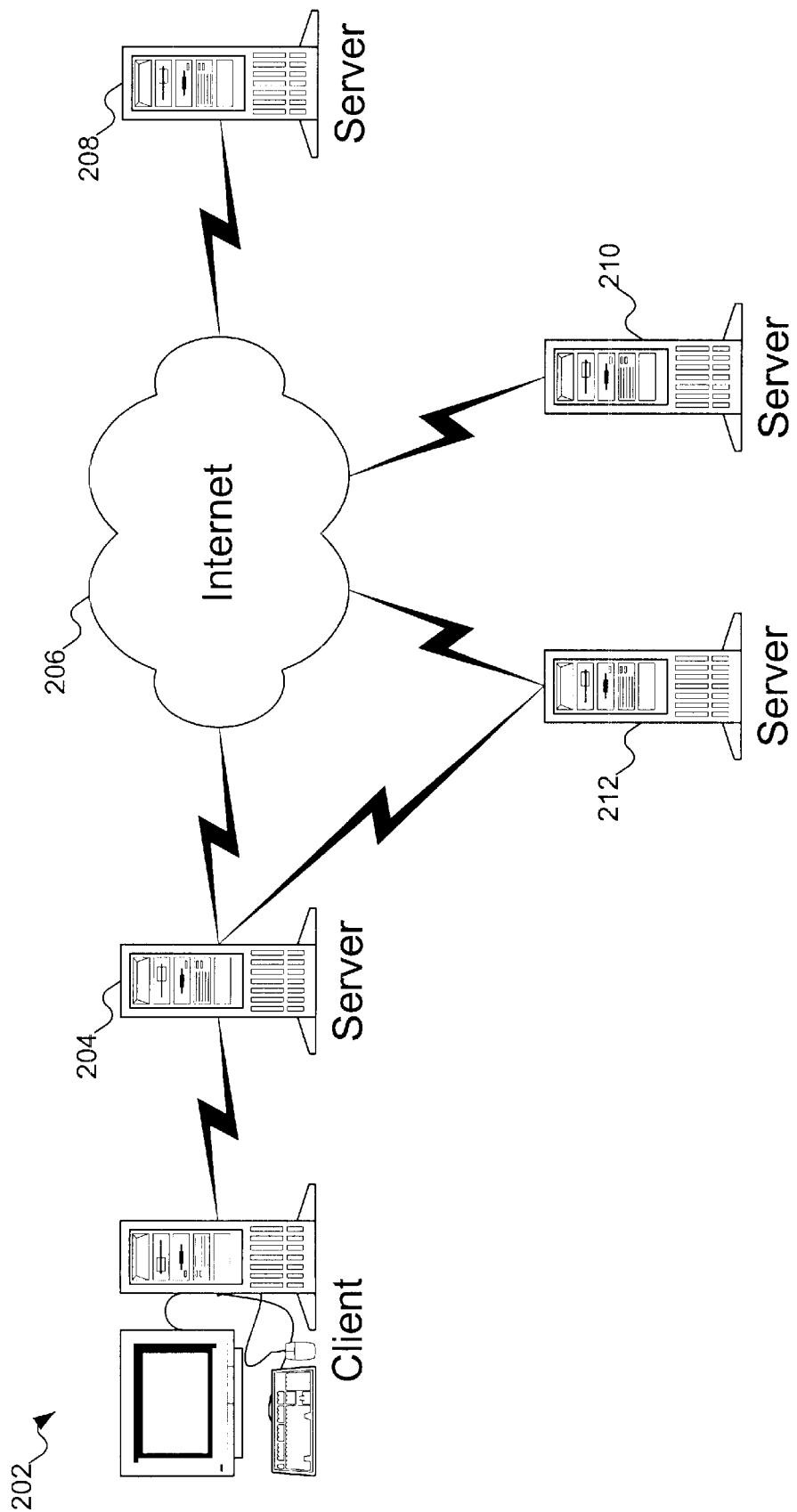
FIG. 3 shows a user connected to the Internet.
Figure 4:
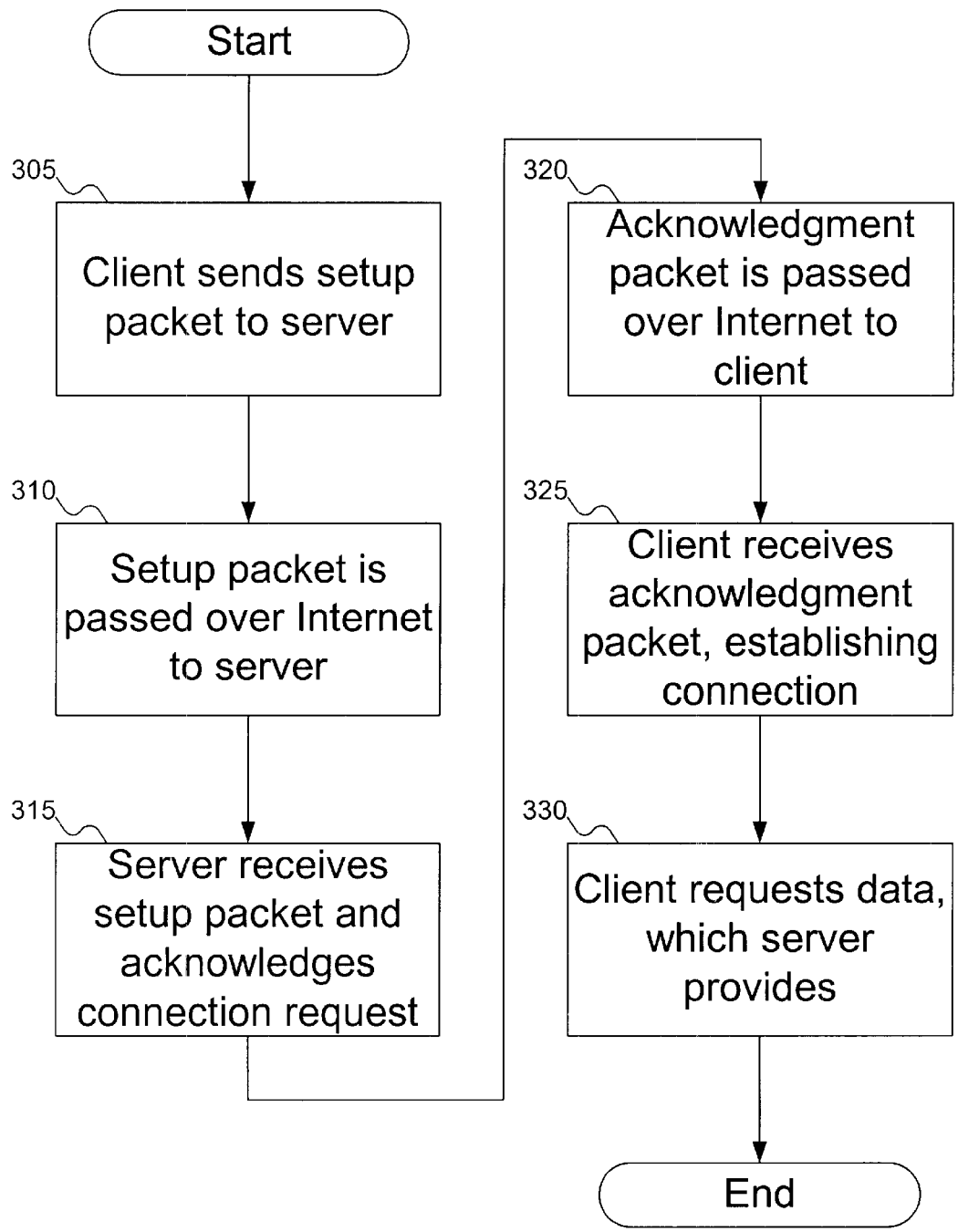
FIG. 4 shows a flowchart of how a client and server establish a connection in the prior art.

FIG. 3 shows a typical user making a data request over the Internet. The user works on a computer 202 that is connected to a server 204. The server 204 is connected to the Internet 206. Other servers 208, 210, and 212 are among the other hosts attached to the Internet 206. When computer 202 requests data from destination server 208, the flowchart of FIG. 4 shows the steps involved in establishing the connection in the prior art. At step 305, the client sends a setup packet to the destination server. This setup packet requests a connection with the server. At step 310, the setup packet is passed node by node over the Internet until it reaches the destination server. When the server finally receives the setup packet at step 315, the server acknowledges the setup packet. The acknowledgement is then passed back to the client over the Internet at step 320. When the client receives the acknowledgement at step 325, the connection is established. The client then requests data and the server provides data in step 330 over the established connection.

Returning to FIG. 3, the server 204 and all other servers connecting computer 202 and destination server 208 merely act as funnels, passing the packets between the computers. No effort is made to more efficiently find the requested data. For example, server 212 may include a web cache containing a copy of the data requested by computer 202 (for example, server 212 is a mirror to server 208). Server 204 currently cannot redirect the data request to the closer server 212 containing the same requested data.

Figure 5:
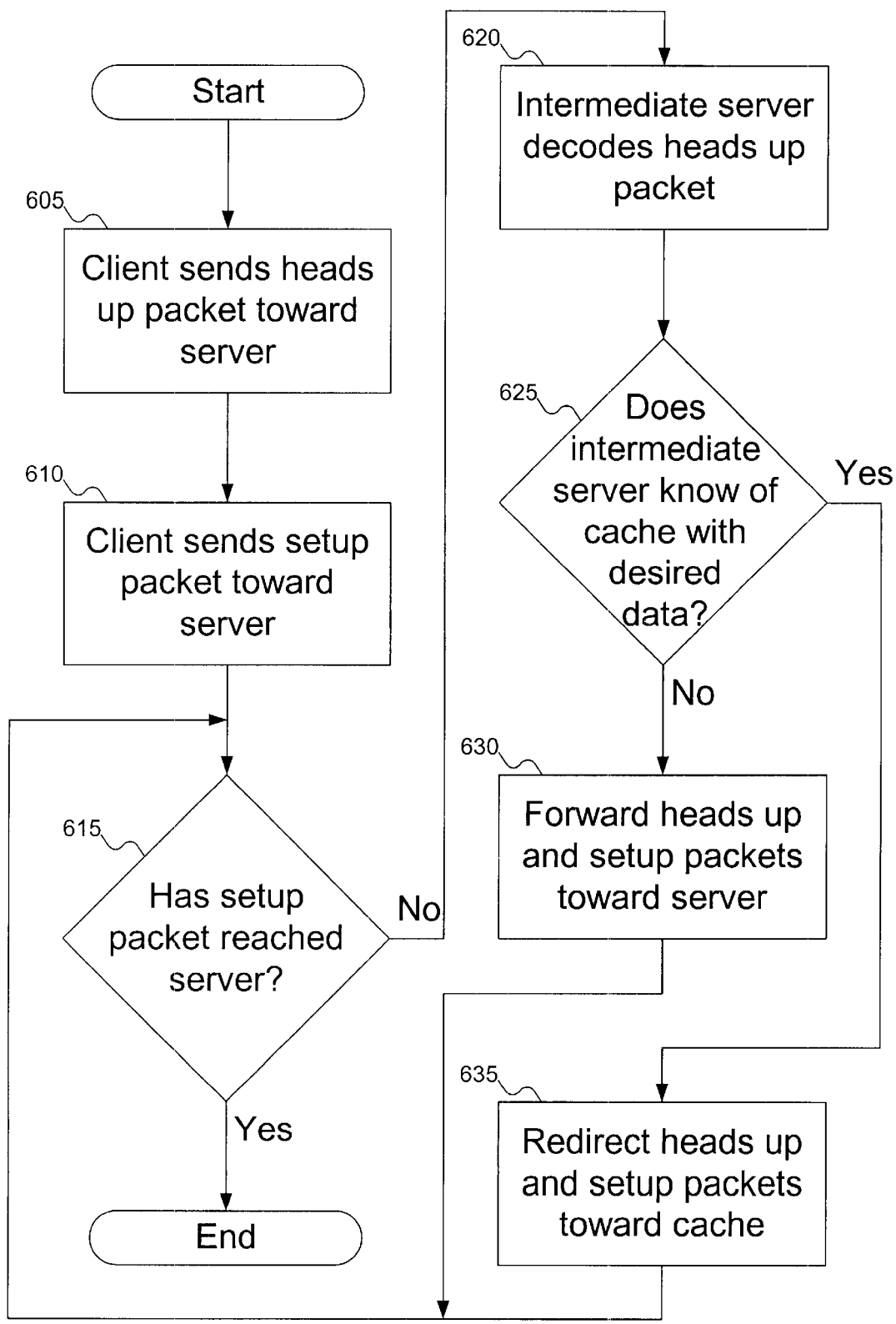
FIG. 5 shows a flowchart of how a client and server establish a connection in the invention.

The invention uses a heads up packet (HUP). FIG. 5 shows how a connection is established using HUPs. In step 605, the client sends a HUP. The HUP describes the data the client desires. In step 610, the client sends a setup packet. The setup packet requests a connection with the destination server. Note that the HUP is sent before the setup packet. This helps to ensure that the HUP arrives at an intermediary server before the setup packet, helping the intermediary server route the setup packet promptly. In step 615, the server checks to see the setup packet has reached its destination. Assuming it has not, at step 620, the intermediary server that has received the setup and heads up packets decodes the HUP to determine what data the client has requested. At step 625, the server determines if it knows of a cache storing the desired data. If not, then at step 630 the intermediary server forwards the setup and HUP in the direction of the destination. Otherwise, at step 635 the intermediary server changes the destination of the setup and heads up packets towards the nearer source and forwards the packets. Control then returns to step 615.

In step 625, there is an implied requirement that an intermediary server have knowledge about the documents stored in nearby caches. One example of a simple way the intermediary server collects information about the contents of nearby caches is as follows: Assume a server A contains a cache and forwards a document from that cache to a neighboring server B known to have a cache. If server A then removes that document from its cache, server A can forward requests for that document to server B. Server B may request the document from server A sometime in the future. This is an indication to server A that server B no longer has the document in cache. Accordingly, server A then no longer forwards the requests to server B. There are many other ways that the intermediary server can track the contents of nearby caches that go beyond the scope of this invention.

Figure 7:
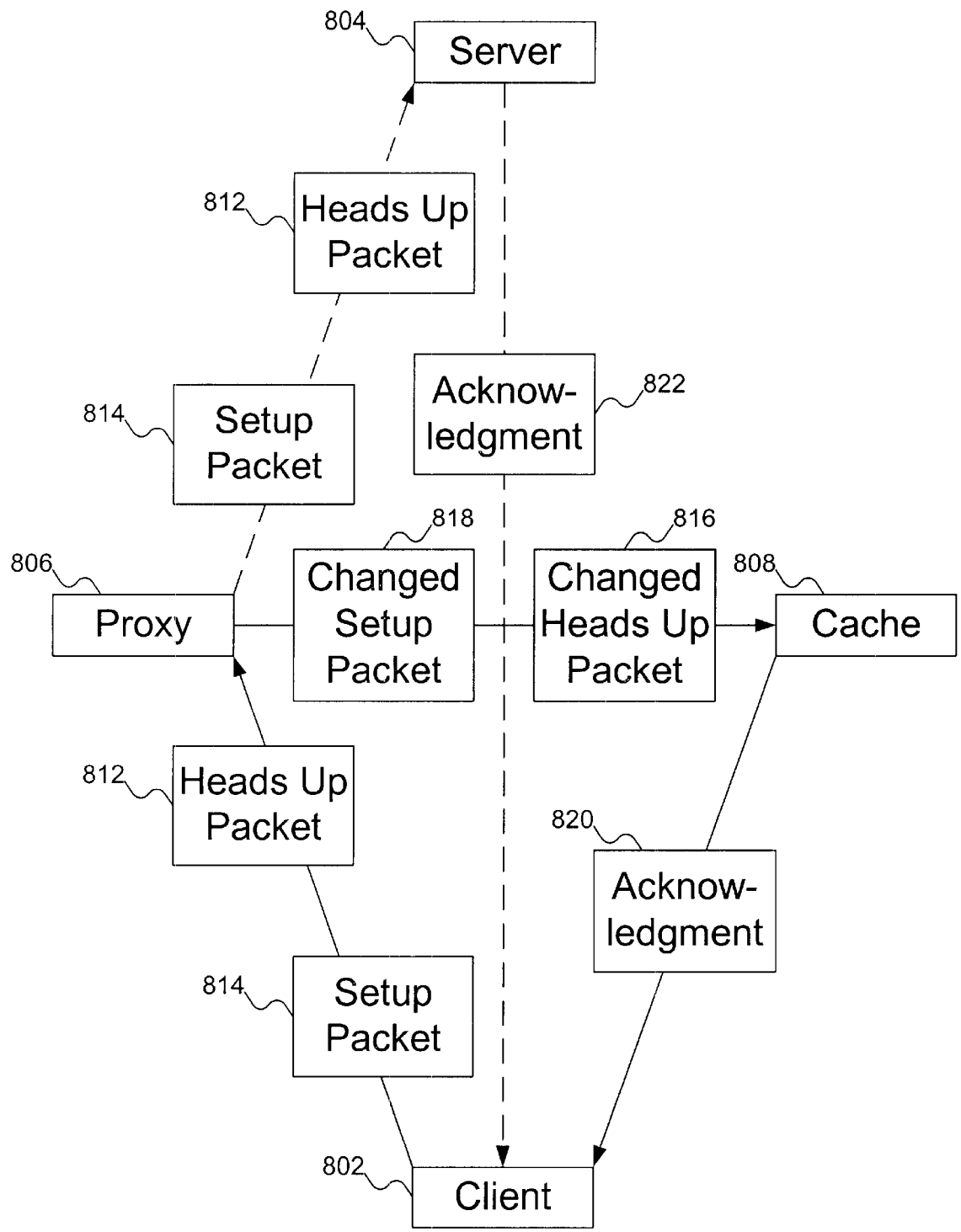
FIG. 7 shows what happens when a proxy forwards a setup packet to a web cache rather than the requested server.

FIG. 7 shows how the flowchart of FIG. 5 operates. In FIG. 7, client 802 sends a HUP 812 and a setup packet 814 toward server 804. Server 804 is the server from which client 802 requests the data. Proxy 806, an example of a content routing device and acting as an intermediary server, receives the HUP 812 and the setup packet 814. After decoding HUP 812, proxy 806 has three choices. If proxy 806 does not know of a cache closer to server 802 which contains the requested data, proxy 806 forwards HUP 812 and setup packet 814 toward server 804. In this case, when the HUP 812 and setup packet 814 eventually reach server 804, server 804 accepts the packets and issues an acknowledgment 822 to client 802. If proxy 806 knows of a cache closer to client 802 which contains the requested data (for example, cache 808), proxy 806 changes the HUP 812 and setup packet 814 to request the data from cache 808. Proxy 806 then forwards the changed HUP 816 and changed setup packet 818 toward cache 808. In this case, when cache 808 receives the changed HUP 816 and changed setup packet 818, cache 808 accepts the packets and issues an acknowledgment 820 to client 802. As a third choice, if proxy 806 is also a web cache and happens to contain the requested data, proxy 806 can itself accept the HUP 812 and setup packet 814 and issue an acknowledgement back to client 802. This case effectively combines proxy 806 and cache 808 of FIG. 7 into one network element.

Figure 6:
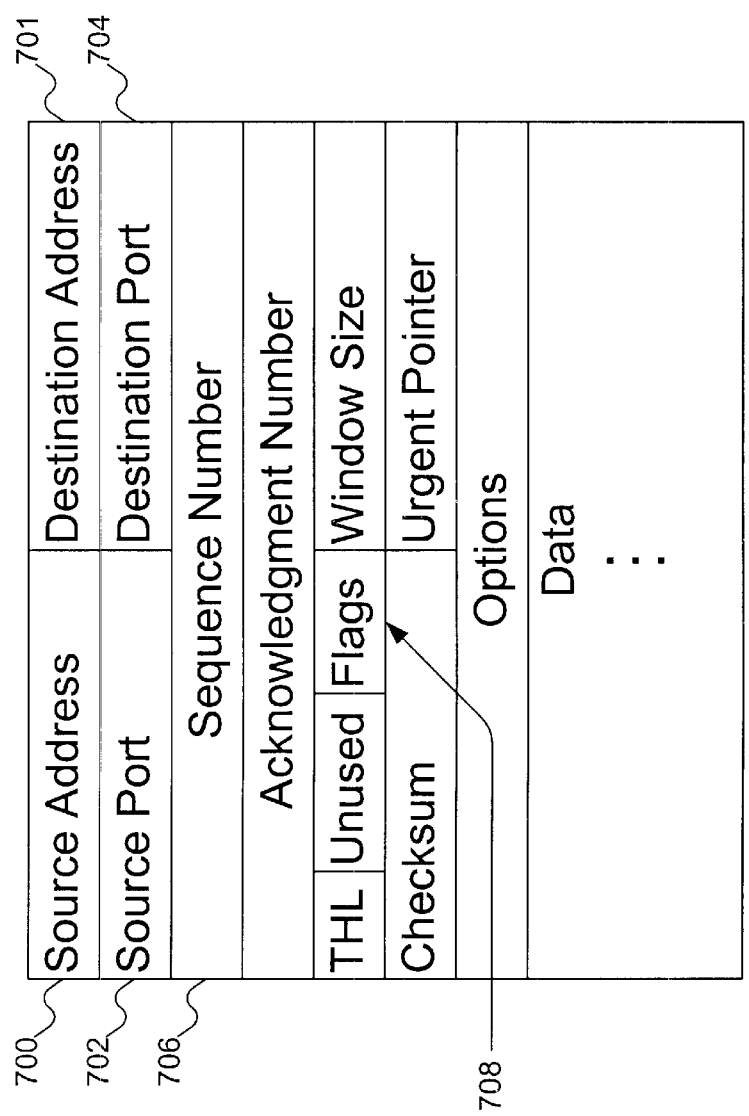
FIG. 6 shows the structure of a TCP packet header.

In a preferred embodiment, the setup and heads up packets are implemented in a TCP/IP network. However, the invention is applicable to any packet-based network. In such a network, the setup packet is commonly referred to as a SYN packet because its synchronize flag is set. The header structure of a TCP packet is shown in FIG. 6. Some fields contained in the TCP header are the source address 700, destination address 701, source port 702, the destination port 704, and the flags 708. The header for the setup packet and associated HUP are identified by the same source address 700, destination address 701, destination port 704, and sequence number 706. Source address 700 and destination address 701 indicate the client and desired server, respectively. Source port 702 and destination port 704 indicate the desired ports within the client and server, respectively. Sequence number 706 is an identifying number associated with the packet (in general, each packet on the Internet receives its own sequence number). Flags 708 indicate special conditions about a packet.

It is important that content routing operate within the context of the Internet as it exists today. In another aspect of the invention, an intermediary server not equipped to decode HUPs continues to operate after receiving a HUP. Such an intermediary server drops the HUP and does not consider it part of an existing connection. To achieve this goal in a TCP network, the HUP source port 702 is set to 0 and the reset flag 708 is set to 1. Setting the source port 702 to 0 guarantees that the HUP will not match any existing data stream, and setting the reset flag ensures that the intermediary server will not respond to the HUP.

It is important that the heads up packet be quickly decoded. In a third aspect of the invention, the HUP is given a very small payload size. This ensures that an intermediary server does not wait for a long time to receive the HUP. A small payload also helps to prevent the HUP from being fragmented en route to the intermediate server. If the HUP has a total size smaller than the minimum packet size at which packets can be fragmented, the HUP will always remain intact.

It is important that the client be able to accept an acknowledgement from a server other than the server from which the client originally requested data. In another aspect of the invention, the client 802 is modified to accept an acknowledgement from a server other than that requested. For example, in FIG. 7, assume client 802 sends a HUP 812 and a setup packet 814 requesting a connection with the server 804. The proxy 806 receives the HUP 812 and the setup packet 814. Proxy 806 decodes the HUP 812, and in doing so recognizes that cache 808 has the requested data and is closer to the client 802 than the server 804 from which client 802 originally requested the data. Proxy 806 then changes the HUP 816 and the setup packet 818 to request the information from cache 808 and forwards the changed setup and heads up packets to cache 808. Cache 808 receives changed HUP 816 and changed setup packet 818. Cache 808 recognizes that the communication request is with itself, and sends the client 802 an acknowledgement 820. Unless client 802 is prepared to accept the acknowledgement 820 from cache 808 instead of server 804, client 802 will not receive the requested data. Because client 802 issued a HUP, it must have been prepared to accept the acknowledgement 820 from a network device other than device identified in the original data request, such as cache 808.

Client 802 may not be configured to accept the acknowledgement 820 from servers other than the original destination server 804. Client 802 then does not send out the HUP 812. Without HUP 812, proxy 806 does not forward the HUP 812 and setup packet 814 to servers other than server 804. Accordingly, an acknowledgement 820 is not returned from another server 804.

If proxy 806 is not equipped to decode HUP 812, then proxy 806 should drop HUP 812 and forwarded setup packet 814 alone to server 804.

The intermediary server may receive the HUP but not receive a corresponding setup packet. Thus, in another aspect of the invention, the HUP is kept for a period of time that depends on receiving an associated setup packet. If the intermediary server does not receive the matching setup packet within some period of time after receiving the HUP, the intermediary server drops the HUP. There is no concern about dropping the HUP because client resends another HUP when the setup packet is resent. In a TCP/IP network, the HUP is bound to the setup packet by including the same source address, destination address, destination port, and sequence number of the setup packet.

There is also the possibility that a HUP may be lost. If a setup packet is received but not a matching HUP, the intermediary server cannot take advantage of content routing. When a setup packet is received that indicate an associated HUP, the intermediary server drops the setup packet and waits for the client to re-transmit. Because the setup packet contains an indication that there is a matching HUP, the intermediary server has the option of dropping the setup packet if the HUP does not arrive. Thus, the intermediary server can possible wait for another setup packet and associated HUP that enable faster data access than possible from the original destination server identified in the original setup packet.

Aside from reducing latency and demands on bandwidth by effectively using web caching, using HUPs has potential in other contexts as well. For example, HUPs may be useful in connection with mobile computing on the Internet (avoiding or minimizing the problem of tunneling). HUPs may also be allow for more efficient web traffic not through using a nearby web cache but in finding a less direct route to the destination server through a connection with greater available bandwidth.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A system for routing packets based on data content, the system comprising:

a client sending a heads up packet prior to establishing a connection for transferring data, the heads up packet identifying the data to be transferred over the connection; and a content routing device receiving and decoding the heads up packet before the connection with the client is established and routing the connection according to the identified data in the heads up packet.

2. A system according to claim 1 wherein:
the client sends an associated setup packet to establish the connection after the heads up packet;
the heads up packet identifies the associated setup packet; and
the content routing device routes the associated setup packet according to the identified data in the heads up packet.

3. A system according to claim 2 wherein the content routing device reroutes the heads up packet and the associated setup packet to a network device having a cache containing the identified data in the heads up packet without the content routing device ever establishing a connection with the client.

4. A system according to claim 2 wherein the content routing device forwards the heads up packet and the associated setup packet to another content routing device closer to a destination server to establish the connection when there is no other content routing device containing the identified data in the heads up packet.

5. A system according to claim 2 wherein the content routing device accepts the associated setup packet and then sends another heads up packet and another associated setup packet to another content routing device requesting the data for the client.

6. A system according to claim 2 wherein the connection is established by the content routing device sending an acceptance of the associated setup packet to the client and the client acknowledging the acceptance of the associated setup packet back to the content routing device.

7. A system for routing packets based on data content, the system comprising:
a client sending a heads up packet prior to establishing a connection for transferring data and an associated setup packet to establish the connection after the heads up packet, the heads up packet identifying the data to be transferred over the connection and identifying the associated setup packet; and
a content routing device receiving and decoding the heads up packet before the connection with the client is established and routing the connection according to the identified data in the heads up packet, the content routing device routing the associated setup packet according to the identified data in the heads up packet and dropping the heads up packet if the content routing device does not receive the associated setup packet.

8. A system according to claim 2 wherein the associated setup packet includes an association to the heads up packet.

9. A system for routing packets based on data content, the system comprising:
a client sending a heads up packet prior to establishing a connection for transferring data and an associated setup packet to establish the connection after the heads up packet, the heads up packet identifying the data to be transferred over the connection and identifying the associated setup packet and the associated setup packet includes an association to the heads up packet; and
a content routing device receiving and decoding the heads up packet before the connection with the client is established and routing the connection according to the identified data in the heads up packet, the content routing device routing the associated setup packet according to the identified data in the heads up packet and dropping the associated setup packet if the content routing device does not receive the associated heads up packet.

10. A system according to claim 2 wherein the associated setup packet is a TCP/IP packet that sets up the connection as a TCP connection.

11. A system for routing packets based on data content, the system comprising:
a client sending a heads up packet prior to establishing a connection for transferring data and an associated setup packet to establish the connection after the heads up packet, the heads up packet identifying the data to be transferred over the connection and identifying the associated setup packet and the associated setup packet being a TCP/IP packet that sets up the connection as a TCP connection, the heads up packet and the associated setup packet having a same destination address, source address, destination port and sequence number; and
a content routing device receiving and decoding the heads up packet before the connection with the client is established and routing the connection according to the identified data in the heads up packet, the content routing device routing the associated setup packet according to the identified data in the heads up packet and dropping the associated setup packet if the content routing device does not receive the associated heads up packet.

12. A system for routing packets based on data content, the system comprising:
a client sending a heads up packet prior to establishing a connection for transferring data and an associated setup packet to establish the connection after the heads up packet, the heads up packet identifying the data to be transferred over the connection and identifying the associated setup packet and the associated setup packet being a TCP/IP packet that sets up the connection as a TCP connection, the heads up packet includes a source port and reset flag set that prevents the content routing device from establishing a second connection with the client based on the heads up packet; and
a content routing device receiving and decoding the heads up packet before the connection with the client is established and routing the connection according to the identified data in the heads up packet, the content routing device routing the associated setup packet according to the identified data in the heads up packet and dropping the associated setup packet if the content routing device does not receive the associated heads up packet.

13. A system according to claim 12 wherein the source port of the heads up packet is set to 0 and the reset flag of the heads up packet is set to 1.

14. A system according to claim 1 wherein the content routing device drops the heads up packet if the content routing device is not configured to decode the heads up packet.

15. A system according to claim 1 wherein the content routing device routes the connection according to the identified data in the heads up packet and available capacity of network devices.

16. A content routing device, comprising:
an input receiving a heads up packet and an associated setup packet, the heads up packet identifying data to be transferred over a network connection and identifying the associated setup packet, and the associated setup packet used for setting up the network connection; and
a processor decoding the heads up packet prior to establishing the network connection, the processor routing the associated setup packet for establishing the network connection according to the identified data in the heads up packet.

17. A content routing device according to claim 16 wherein the processor reroutes the associated setup packet and the heads up packet to a network device having a cache containing the identified data in the heads up packet without the content routing device ever establishing a network connection.

18. A content routing device according to claim 16 wherein the processor routes the associated setup packet and the heads up packet to another content routing device closer to a destination server to establish the network connection when there is no other content routing device containing the identified data in the heads up packet.

19. A content routing device according to claim 16 wherein the processor accepts the associated setup packet and then sends another heads up packet and another associated setup packet to another content routing device requesting the identified data in the heads up packet.

20. A content routing device according to claim 16 wherein the processor sends an acceptance of the associated setup packet.

21. A content routing device, comprising:
an input receiving a heads up packet and an associated setup packet, the heads up packet identifying data to be transferred over a network connection and identifying the associated setup packet, and the associated setup packet used for setting up the network connection; and
a processor decoding the heads up packet prior to establishing the network connection, the processor routing the associated setup packet for establishing the network connection according to the identified data in the heads up packet, the processor dropping the heads up packet if the processor does not receive the associated setup packet.

22. A content routing device according to claim 16 wherein the associated setup packet includes an association to the heads up packet.

23. A content routing device, comprising:
an input receiving a heads up packet and an associated setup packet, the heads up packet identifying data to be transferred over a network connection and identifying the associated setup packet, and the associated setup packet used for setting up the network connection, the associated setup packet including an association to the heads up packet; and
a processor decoding the heads up packet prior to establishing the network connection, the processor routing the associated setup packet for establishing the network connection according to the identified data in the heads up packet, the processor dropping the associated setup packet if the processor does not receive the associated heads up packet.

24. A content routing device according to claim 16 wherein the processor drops the heads up packet if the processor is not configured to decode the heads up packet.

25. A content routing device according to claim 16 wherein the processor reroutes the network connection according to the identified data in the heads up packet and available capacity of network devices.

26. A content routing device according to claim 16 wherein the associated setup packet is a TCP/IP packet that sets up the network connection as a TCP connection.

27. A content routing device, comprising:
an input receiving a heads up packet and an associated setup packet, the heads up packet identifying data to be transferred over a network connection and identifying the associated setup packet, and the associated setup packet used for setting up the network connection, the associated setup packet being a TCP/IP packet that sets up the network connection as a TCP connection, the heads up packet and the associated setup packet having a same destination address, source address, destination port and sequence number; and
a processor decoding the heads up packet prior to establishing the network connection, the processor routing the associated setup packet for establishing the network connection according to the identified data in the heads up packet.

28. A content routing device, comprising:
an input receiving a heads up packet and an associated setup packet, the heads up packet identifying data to be transferred over a network connection and identifying the associated setup packet, and the associated setup packet used for setting up the network connection, the heads up packet includes a source port and reset flag set that prevents the content routing device from establishing a connection based on the heads up packet; and
a processor decoding the heads up packet prior to establishing the network connection, the processor routing the associated setup packet for establishing the network connection according to the identified data in the heads up packet.

29. A content routing device according to claim 28 wherein the source port of the heads up packet is set to 0 and the reset flag of the heads up packet is set to 1.

30. A network element comprising:
an output outputting a heads up packet and an associated setup packet, wherein:
the associated setup packet contains information for establishing a network connection;
the heads up packet identifies data transmitted over the network connection and identifies the associated setup packet; and
the heads up packet enables routing of the associated setup packet according to the identified data in the heads up packet before establishing the network connection.

31. A network element according to claim 30 further including an input receiving an acceptance of the associated setup packet from a different destination location other than a destination location requested by the network element.

32. A network element according to claim 30 wherein the associated setup packet includes an association to the heads up packet.

33. A network element according to claim 30 wherein the associated setup packet is a TCP/IP packet that sets up the network connection as a TCP connection.

34. A network element comprising:
an output outputting a heads up packet and an associated setup packet, wherein:
the associated setup packet contains information for establishing a network connection, the associated setup packet being a TCP/IP packet that sets up the network connection as a TCP connection;
the heads up packet identifies data transmitted over the network connection and identifies the associated setup packet, the heads up packet and the associated setup packet having a same destination address, source address, destination port and sequence number; and
the heads up packet enables routing of the associated setup packet according to the identified data in the heads up packet before establishing the network connection.

35. A network element comprising:
an output outputting a heads up packet and an associated setup packet, wherein:
the associated setup packet contains information for establishing a network connection, the associated setup packet being a TCP/IP packet that sets up the network connection as a TCP connection;
the heads up packet identifies data transmitted over the network connection and identifies the associated setup packet, the heads up packet including a source port and reset flag set that prevents establishment of a connection based on the heads up packet; and
the heads up packet enables routing of the associated setup packet according to the identified data in the heads up packet before establishing the network connection.

36. A network element according to claim 35 wherein the source port of the heads up packet is set to 0 and the reset flag of the heads up packet is set to 1.

37. A method for routing packets to different network elements, the method comprising:
receiving a heads up packet from a client, the heads up packet identifying data to be transferred over a network connection and identifying a matching setup packet;
receiving the matching setup packet from the client used for establishing the network connection;
decoding the identified data in the heads up packet;
selecting one of the network elements associated with the identified data in the heads up packet;
rerouting the matching setup packet to the selected one of the network elements prior to establishing a network connection with the client, and
establishing the network connection between the client and the selected network element using the rerouted matching setup packet.

38. The method of claim 37, wherein selecting one of the network elements includes selecting a network element that is most associated with the identified data in the heads up packet.

39. A method for routing packets to different network elements, the method comprising:
receiving a heads up packet from a client, the heads up packet identifying data to be transferred over a network connection and identifying a matching setup packet;
receiving the matching setup packet from the client used for establishing the network connection;
decoding the identified data in the heads up packet;
selecting one of the network elements associated with the identified data in the heads up packet;
rerouting the matching setup packet to the selected one of the network elements prior to establishing a network connection with the client, including rerouting the heads up packet and the matching setup packet toward a destination requested by the client when none of the network elements is selected as associated with the identified data in the heads up packet; and
establishing the network connection between the client and the selected network element using the rerouted matching setup packet.

40. A method for routing packets to different network elements, the method comprising:
receiving a heads up packet from a client, the heads up packet identifying data to be transferred over a network connection and identifying a matching setup packet;
receiving the matching setup packet from the client used for establishing the network connection;
decoding the identified data in the heads up packet;
selecting one of the network elements associated with the identified data in the heads up packet;
rerouting the matching setup packet to the selected one of the network elements prior to establishing a network connection with the client, including accepting the matching setup packet and sending a second heads up packet and a second matching setup packet to request the identified data; and
establishing the network connection between the client and the selected network element using the rerouted matching setup packet.

41. A method for routing packets to different network elements, the method comprising:
receiving a heads up packet from a client, the heads up packet identifying data to be transferred over a network connection and identifying a matching setup packet;
receiving the matching setup packet from the client used for establishing the network connection;
decoding the identified data in the heads up packet;
selecting one of the network elements associated with the identified data in the heads up packet;
rerouting the matching setup packet to the selected one of the network elements prior to establishing a network connection with the client;
establishing the network connection between the client and the selected network element using the rerouted matching setup packet; and
dropping the heads up packet if the matching setup packet is not received.

42. The method of claim 37, wherein the matching setup packet includes an association to the heads up packet.

43. A method for routing packets to different network elements, the method comprising:
receiving a heads up packet from a client, the heads up packet identifying data to be transferred over a network connection and identifying a matching setup packet;
receiving the matching setup packet from the client used for establishing the network connection, the matching setup packet including an association to the heads up packet;
decoding the identified data in the heads up packet;
selecting one of the network elements associated with the identified data in the heads up packet;
rerouting the matching setup packet to the selected one of the network elements prior to establishing a network connection with the client;
establishing the network connection between the client and the selected network element using the rerouted matching setup packet; and
dropping the matching setup packet if the associated heads up packet is not received.

44. The method of claim 37 further comprising dropping the heads up packet if it cannot be decoded.

45. The method of claim 37 wherein the setup packet is a TCP/IP packet that sets up the network connection as a TCP connection.

46. A method for routing packets to different network elements, the method comprising:
receiving a heads up packet from a client, the heads up packet identifying data to be transferred over a network connection and identifying a matching setup packet;
receiving the matching setup packet from the client used for establishing the network connection, the setup packet being a TCP/IP packet that sets up the network connection as a TCP connection, the heads up packet and the matching setup packet having a same destination address, source address, destination port and sequence number;

decoding the identified data in the heads up packet;

selecting one of the network elements associated with the identified data in the heads up packet;

rerouting the matching setup packet to the selected one of the network elements prior to establishing a network connection with the client, and establishing the network connection between the client and the selected network element using the rerouted matching setup packet.

47. A method for routing packets to different network elements, the method comprising:

receiving a heads up packet from a client, the heads up packet identifying data to be transferred over a network connection and identifying a matching setup packet;

receiving the matching setup packet from the client used for establishing the network connection, the setup packet being a TCP/IP packet that sets up the network connection as a TCP connection, the heads up packet including a source port and a reset flag set that prevents establishing a second network connection based on the heads up packet;

decoding the identified data in the heads up packet;

selecting one of the network elements associated with the identified data in the heads up packet;

rerouting the matching setup packet to the selected one of the network elements prior to establishing a network connection with the client, and establishing the network connection between the client and the selected network element using the rerouted matching setup packet.

48. The method of claim 47, wherein the source port of the heads up packet is set to 0 and the reset flag of the heads up packet is set to 1.

49. A method for routing packets according to content, comprising:

generating a setup packet containing information for establishing a network connection;

generating a heads up packet identifying data to be transmitted over the network connection, the heads up packet associated with the setup packet; and sending the heads up packet to a first destination address prior to sending the setup packet, the heads up packet enabling the first destination address to reroute the setup packet if necessary to a second destination address associated with the identified data in the heads up packet before establishing the network connection to the first destination address.

50. A method for routing packets according to content, comprising:

generating a setup packet containing information for establishing a network connection;

generating a heads up packet identifying data to be transmitted over the network connection, the heads up packet associated with the setup packet;

sending the heads up packet to a first destination address prior to sending the setup packet, the heads up packet enabling the first destination address to reroute the setup packet if necessary to a second destination address associated with the identified data in the heads up packet before establishing the network connection to the first destination address;

receiving an acceptance of the setup packet from the second destination address; and establishing a network connection with the second destination address.

51. A method according to claim 49 wherein the setup packet is a TCP/IP packet that sets up the network connection as a TCP connection.

52. A method for routing packets according to content, comprising:

generating a setup packet containing information for establishing a network connection, the setup packet being a TCP/IP packet that sets up the network connection as a TCP connection;

generating a heads up packet identifying data to be transmitted over the network connection, the heads up packet associated with the setup packet, the heads up packet and the setup packet have a same destination address, source address, destination port and sequence number; and sending the heads up packet to a first destination address prior to sending the setup packet, the heads up packet enabling the first destination address to reroute the setup packet if necessary to a second destination address associated with the identified data in the heads up packet before establishing the network connection to the first destination address.

53. A method for routing packets according to content, comprising:

generating a setup packet containing information for establishing a network connection, the setup packet being a TCP/IP packet that sets up the network connection as a TCP connection;

generating a heads up packet identifying data to be transmitted over the network connection, the heads up packet associated with the setup packet, the heads up packet including a source port and reset flag set that prevents establishment of a connection based on the heads up packet; and sending the heads up packet to a first destination address prior to sending the setup packet, the heads up packet enabling the first destination address to reroute the setup packet if necessary to a second destination address associated with the identified data in the heads up packet before establishing the network connection to the first destination address.

54. A method according to claim 53 wherein the source port of the heads up packet is set to 0 and the reset flag of the heads up packet is set to 1.

55. A method according to claim 49 wherein the setup packet is associated with the heads up packet.

56. An article comprising a machine-accessible medium having associated data that, when accessed, results in a machine:

receiving a heads up packet from a client, the heads up packet identifying data to be transferred over a network connection and identifying a matching setup packet;

receiving the matching setup packet from the client used for establishing the network connection;

decoding the identified data in the heads up packet;

selecting one of the network elements associated with the identified data in the heads up packet;

rerouting the matching setup packet to the selected one of the network elements prior to establishing a network connection with the client, including rerouting the heads up packet and the matching setup packet toward a destination requested by the client when none of the network elements is selected as associated with the identified data in the heads up packet; and establishing the network connection between the client and the selected network element using the rerouted matching setup packet.

57. An article comprising a machine-accessible medium having associated data that, when accessed, results in a machine:

receiving a heads up packet from a client, the heads up packet identifying data to be transferred over a network connection and identifying a matching setup packet;

receiving the matching setup packet from the client used for establishing the network connection;

decoding the identified data in the heads up packet;

selecting one of the network elements associated with the identified data in the heads up packet;

rerouting the matching setup packet to the selected one of the network elements prior to establishing a network connection with the client, including accepting the matching setup packet and sending a second heads up packet and a second matching setup packet to request the identified data; and establishing the network connection between the client and the selected network element using the rerouted matching setup packet.

58. A content routing device, comprising:

means for receiving a heads up packet from a client, the heads up packet identifying data to be transferred over a network connection and identifying a matching setup packet;

means for receiving the matching setup packet from the client used for establishing the network connection;

means for decoding the identified data in the heads up packet;

means for selecting one of the network elements associated with the identified data in the heads up packet;

means for rerouting the matching setup packet to the selected one of the network elements prior to establishing a network connection with the client, including rerouting the heads up packet and the matching setup packet toward a destination requested by the client when none of the network elements is selected as associated with the identified data in the heads up packet; and means for establishing the network connection between the client and the selected network element using the rerouted matching setup packet.

59. A content routing device, comprising:

means for receiving a heads up packet from a client, the heads up packet identifying data to be transferred over a network connection and identifying a matching setup packet;

means for receiving the matching setup packet from the client used for establishing the network connection;

means for decoding the identified data in the heads up packet;

means for selecting one of the network elements associated with the identified data in the heads up packet;

means for rerouting the matching setup packet to the selected one of the network elements prior to establishing a network connection with the client, including accepting the matching setup packet and sending a second heads up packet and a second matching setup packet to request the identified data; and means for establishing the network connection between the client and the selected network element using the rerouted matching setup packet.

* * * * *